(12) United States Patent
Li et al.

(10) Patent No.: US 11,475,317 B2
(45) Date of Patent: Oct. 18, 2022

(54) MICROALLOYED STEEL MECHANICAL PROPERTY PREDICTION METHOD BASED ON GLOBALLY ADDITIVE MODEL

(71) Applicant: WUHAN UNIVERSITY OF SCIENCE AND TECHNOLOGY, Hubei (CN)

(72) Inventors: Weigang Li, Hubei (CN); Ken Deng, Hubei (CN); Wei Yang, Hubei (CN); Chao Liu, Hubei (CN)

(73) Assignee: WUHAN UNIVERSITY OF SCIENCE AND TECHNOLOGY, Hubei (CN)

( * ) Notice: Subject to any disclaimer, the term of this patent is extended or adjusted under 35 U.S.C. 154(b) by 1330 days.

(21) Appl. No.: 15/856,030

(22) Filed: Dec. 27, 2017

(65) Prior Publication Data

US 2018/0260717 A1  Sep. 13, 2018

(30) Foreign Application Priority Data

Mar. 8, 2017  (CN) .......................... 201710135462.8

(51) Int. Cl.
*G06N 5/02* (2006.01)
*B21B 1/22* (2006.01)
(Continued)

(52) U.S. Cl.
CPC .............. *G06N 5/022* (2013.01); *B21B 1/22* (2013.01); *B21B 2001/225* (2013.01);
(Continued)

(58) Field of Classification Search
CPC .. G06F 2113/24; G06F 30/20; G06F 2119/06; G06F 2119/08; G06F 2119/18;
(Continued)

(56) References Cited

FOREIGN PATENT DOCUMENTS

CN      101046682 A   *   10/2007
CN      104694720 B   *   5/2017

OTHER PUBLICATIONS

Xu et al. "Equilibrium Model of Precipitation in Microalloyed Steels". The Minerals, Metals & Materials Society and ASM International 2010. 16 Pages. (Year: 2010).*

(Continued)

*Primary Examiner* — Eunhee Kim
(74) *Attorney, Agent, or Firm* — JCIPRNET

(57) ABSTRACT

The present invention provides a microalloyed steel mechanical property prediction method based on globally additive model, including the following steps: determining some influencing factors of the microalloyed steel mechanical property prediction model; calculating the components and contents of carbonitride precipitation in a microalloyed steel rolling process; expressing the microalloyed steel mechanical property prediction model as an additive form of several submodels according to generalized additive model; estimating the microalloyed steel mechanical property prediction model; and verifying reliability of the submodels. The microalloyed steel property prediction models obtained in the foregoing solution have advantages such as high prediction precision and a wide adaptation range, and may be used for design of new products and steel grade component optimization, so as to reduce the quantity of physical tests, shorten the product research and development cycle, and reduce costs.

5 Claims, 12 Drawing Sheets

(51) Int. Cl.
*G06F 113/24* (2020.01)
*C21D 7/13* (2006.01)
*G06N 7/00* (2006.01)
*G06N 5/00* (2006.01)

(52) U.S. Cl.
CPC ............ *C21D 7/13* (2013.01); *G06F 2113/24* (2020.01); *G06N 5/003* (2013.01); *G06N 7/005* (2013.01)

(58) Field of Classification Search
CPC ........... F05C 2201/0448; G06N 5/022; G06N 5/003; G06N 7/005; B21B 1/22; B21B 2001/225; C21D 7/13
See application file for complete search history.

(56) References Cited

OTHER PUBLICATIONS

Li et al. "Modeling deformation resistance for hot rolling based on generalized additive model". Journal of Iron and Steel Research, International 21 (2017) 11 77-1183. (Year: 2017).*

Gorbachev et al. "Prediction of the Austenite-Grain Size of Microalloyed Steels Based on the Simulation of the Evolution of Carbonitride Precipitates". The Physics of Metals and Metallography, 2015, vol. 116, No. 11, pp. 1127-1134. (Year: 2015).*

Bok, Hyun-Ho, et al. "Thermo-mechanical-metallurgical modeling for hot-press forming in consideration of the prior austenite deformation effect." International Journal of Plasticity 58 (2014): 154-183. (Year: 2014).*

Wolberg, George, and Itzik Alfy. "Monotonic cubic spline interpolation." In Computer Graphics International, 1999. pp. 188-195. 1999. (Year: 1999).*

* cited by examiner

MICROALLOYED STEEL MECHANICAL PROPERTY PREDICTION METHOD BASED ON GLOBALLY ADDITIVE MODEL

CROSS-REFERENCE TO RELATED APPLICATION

This application claims the priority benefit of China application serial no. 201710135462.8, filed on Mar. 8, 2017. The entirety of the above-mentioned patent application is hereby incorporated by reference herein and made a part of this specification.

BACKGROUND

1. Field of the Invention

The present invention relates to the mathematical model of rolling process in the metallurgical industry, and in particular, to a microalloyed steel mechanical property prediction method based on globally additive model.

2. Description of Related Art

To meet social requirements and adapt to market competition, modern steel enterprises need to continuously improve microstructure properties of steel products while reducing production costs and shortening the product research and development cycle. This requires changing the previous expensive and time-consuming physical test method, and completing the steel product design with the help of an advanced computer-aided support tool. The hot rolled strip steel mechanical property prediction model may be used for design of new hot rolled products and steel grade optimization, and therefore has always been one of research directions of metallurgists around the world, and a large amount of related research work has always been underway.

A theoretical basis for establishing the hot rolled strip steel mechanical property prediction model is that the mechanical property of a product depends on the internal microstructure of the product, and the microstructure depends on the components and the production process of the strip steel, both of which have a definite and complex relationship with the mechanical property. The mechanical property prediction model aims to disclose a quantitative relationship between such parameters, thereby predicting the mechanical property of the product according to such parameters. The property prediction issue has been researched for years, and a large quantity of research results have been achieved. Numerous domestic and foreign steel enterprises have tried or used a property prediction system. However, the existing models have deficiencies in terms of reliability, practicability, and extensionality, and cannot meet users' onsite usage requirements.

In terms of modeling, the modeling of property prediction issue is roughly divided into two types: one type is mechanism modeling in which a mathematical model is established based on the laboratory experiment result in physical metallurgy to predict the mechanical property of products; the other type is data modeling in which the mechanical property is predicted according to actual production data by using intelligent algorithms such as artificial neural network. The foregoing two modeling manners both have deficiencies. In the mechanism modeling, a research is often performed by using a single steel grade as a unit, and there is a limitation that many steel grades cannot be covered. In addition, it is inconvenient to study how the components and process affect the microstructure property, and calculation precision is not enough. Disadvantages of the data modeling lie in that, the established models have uncertainties, cannot ensure the extrapolation capability (extensionality), and have high requirements on the precision of training samples, and are not suitable for untrained data samples.

SUMMARY

The present invention is implemented to resolve the foregoing problems, and aims to provide a microalloyed steel mechanical property prediction method based on globally additive model that has high reliability, strong extensionality, and wide practicability.

The microalloyed steel mechanical property prediction method based on globally additive model provided in the present invention comprises the following steps:

step A, determining some influencing factors of the microalloyed steel mechanical property prediction model;

step B, calculating components and contents of carbonitride precipitation in the microalloyed steel rolling process;

step C, expressing the microalloyed steel mechanical property prediction model as an additive form of several submodels according to generalized additive model;

step D, estimating the microalloyed steel mechanical property prediction model; and step E, verifying reliability of the submodels.

In the microalloyed steel mechanical property prediction method based on globally additive model provided in the present invention, the step A comprises the following steps:

step A-1, classifying influencing factors into four categories according to metallurgical mechanism, data collection process, and priori knowledge: chemical components, process parameters, detection parameters, and abnormal markers; and step A-2, searching for the influencing factors in each category, wherein the step A-2 comprises the following steps:

step A-2-1, selecting some recognized influencing factors; and step A-2-2, searching for some influencing factors that possibly play a significant role.

In the microalloyed steel mechanical property prediction method based on globally additive model provided in the present invention, the step B comprises the following steps:

step B-1, based on the multivariate second-phase solid solution and precipitation theory, developing a thermodynamic model in which the components and the contents of the carbonitride precipitation in hot rolling process are capable of being quantitatively calculated, and considering interactions between the carbonitrides and AlN; and step B-2, solving the thermodynamic model, wherein numerical solution is performed by using the Newton-Raphson algorithm, to determine beginning precipitation temperatures and the precipitation order of the carbonitride and AlN for strips with different components by using an iterative solving process, so as to finally obtain the component and the content of the carbonitride precipitation in the microalloyed steel rolling process.

In the microalloyed steel mechanical property prediction method based on globally additive model, the step C comprises the following steps:

a basic form of the microalloyed steel mechanical property prediction model being $$T_S = \alpha + \sum_{j=1}^{p} S_j(X_j)$$

where $T_S$ represents the mechanical property parameter of strip, $\alpha$ is an intercept, $S_j(\cdot)$ is a cubic smooth spline function of each independent variable $X_j$, and additionally represents submodels of the mechanical property prediction model, and p is the number of independent variables.

In the step D of the microalloyed steel mechanical property prediction method based on globally additive model, the microalloyed steel mechanical property prediction model is estimated according to hot rolling process data collected onsite after a basic form of the steel mechanical property prediction model is determined; and the cubic smooth spline function is estimated by using a Back-fitting algorithm, and a specific implementation process of the estimation is as follows:

initialization let $m = 0$:

$$\alpha_0 = E(Y) = \frac{\sum_{i=1}^{n} y_i}{n}$$

$$f_1^m(X_1) = f_2^m(X_2) = \ldots = f_p^m(X_p) = 0;$$

iteration: let $m = m + 1$:

$$R_i = Y - \alpha_0 - \sum_{j=1}^{i-1} f_j^m(X_j) - \sum_{j=i+1}^{p} f_j^{m-1}(X_j)$$

$$f_i^m(X_i) = E(R_i \mid X_i);$$

and
end: until $$E\left(Y - \alpha_0 - \sum_{j=1}^{p} f_j^m(X_j)\right)^2$$

is less than a predetermined positive constant or the number of iterations reaches the preset number.

In the step E of the microalloyed steel mechanical property prediction method based on globally additive model provided in the present invention, reliability of the submodels needs to be verified according to mechanism knowledge and production data after the mechanical property prediction model is established.

In the microalloyed steel mechanical property prediction method based on globally additive model provided in the present invention, the thermodynamic model is:

$$\ln\frac{yK_{MC}}{[M_a][C_a]} + (1-y)^2 \frac{L_{CN}}{RT} = 0$$

$$\ln\frac{(1-y)K_{MN}}{[M_a][N_a]} + y^2 \frac{L_{CN}}{RT} = 0$$

$$[Al_a][N_a] = K_{AlN}$$

-continued $$M_0 = \frac{1}{2}f_P + (1 - f_P - f_{AlN})[M_a]$$

$$Al_0 = \frac{1}{2}f_{AlN} + (1 - f_P - f_{AlN})[Al_a]$$

$$C_0 = \frac{y}{2}f_P + (1 - f_P - f_{AlN})[C_a]$$

$$N_0 = \frac{(1-y)}{2}f_P + \frac{1}{2}f_{AlN} + (1 - f_P - f_{AlN})[N_a]$$

$K_{MC}$ and $K_{MN}$ are respectively solubility products of pure carbide and nitride, $[M_a]$, $[C_a]$, and $[N_a]$ are mole fractions of solid-soluted elements, $L_{CN}=-4260$ J/mol is an interaction coefficient, R=8.314 J/(K·mol) is the gas constant, T is the absolute temperature, $M_0$, $C_0$, and $N_0$ are mole fractions of the microalloyed element, the carbon element, and the nitrogen element in steel, $Al_0$ is the mole fraction of Al in the steel, $f_P$ is the mole fraction of precipitated niobium carbonitride, $[Al_a]$ is the mole fraction of solid-soluted Al in austenite, $K_{AlN}$ is the solubility product of AlN, and $f_{AlN}$ is the mole fraction of AlN precipitation; in addition, $K_{MC}$, $K_{MN}$, and $K_{AlN}$ are all binary second-phase equilibrium solubility products, and are represented as:

$$K_{MX}=[M_a][X_a]=C \times 10^{A-B/T}$$

and in the formula, $$C = \frac{A_{Fe}^2}{10^4 A_M A_X},$$

$A_{Fe}$, $A_M$, and $A_X$ are respectively relative atomic masses of iron, the alloy element, and the interstitial element, and A and B are coefficients of the solubility product formula.

The microalloyed steel mechanical property prediction method based on globally additive model provided in the present invention is further characterized in that the submodels include two categories: component submodels and process submodels.

In the microalloyed steel mechanical property prediction method based on globally additive model of the present invention, the interstitial element is the carbon element.

In the microalloyed steel mechanical property prediction method based on globally additive model provided in the present invention, the interstitial element is the nitrogen element.

Functions and Effects of the Invention

According to the microalloyed steel mechanical property prediction method based on globally additive model provided in the present invention, "globally" means that modeling is performed by collecting production data of multiple steel grades, but not for only a specific steel grade; "additive" means that a model is additive in form. The mechanical property prediction model is divided into multiple submodels by using a generalized additive form.

In addition, the effect of carbonitride precipitation of microalloyed elements on the mechanical property needs to be considered. The thermodynamic model is developed based on the multivariate second-phase solid solution and precipitation theory, the components and contents of carbonitride precipitation during rolling process at different temperatures for microalloyed steels with different components are quantitatively calculated, and the calculated component and the content of the carbonitride precipitation are combined with actual production data of microalloyed steel, to establish the mechanical property prediction model that has high reliability, strong extensionality, and wide practicability.

The microalloyed steel mechanical property prediction model obtained in the foregoing technical solution has advantages such as high prediction precision and a wide adaptation range, and may be used for design of new microalloyed steel products and steel grade optimization, so as to reduce the number of physical tests, shorten the product research and development cycle, and reduce research and development costs.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
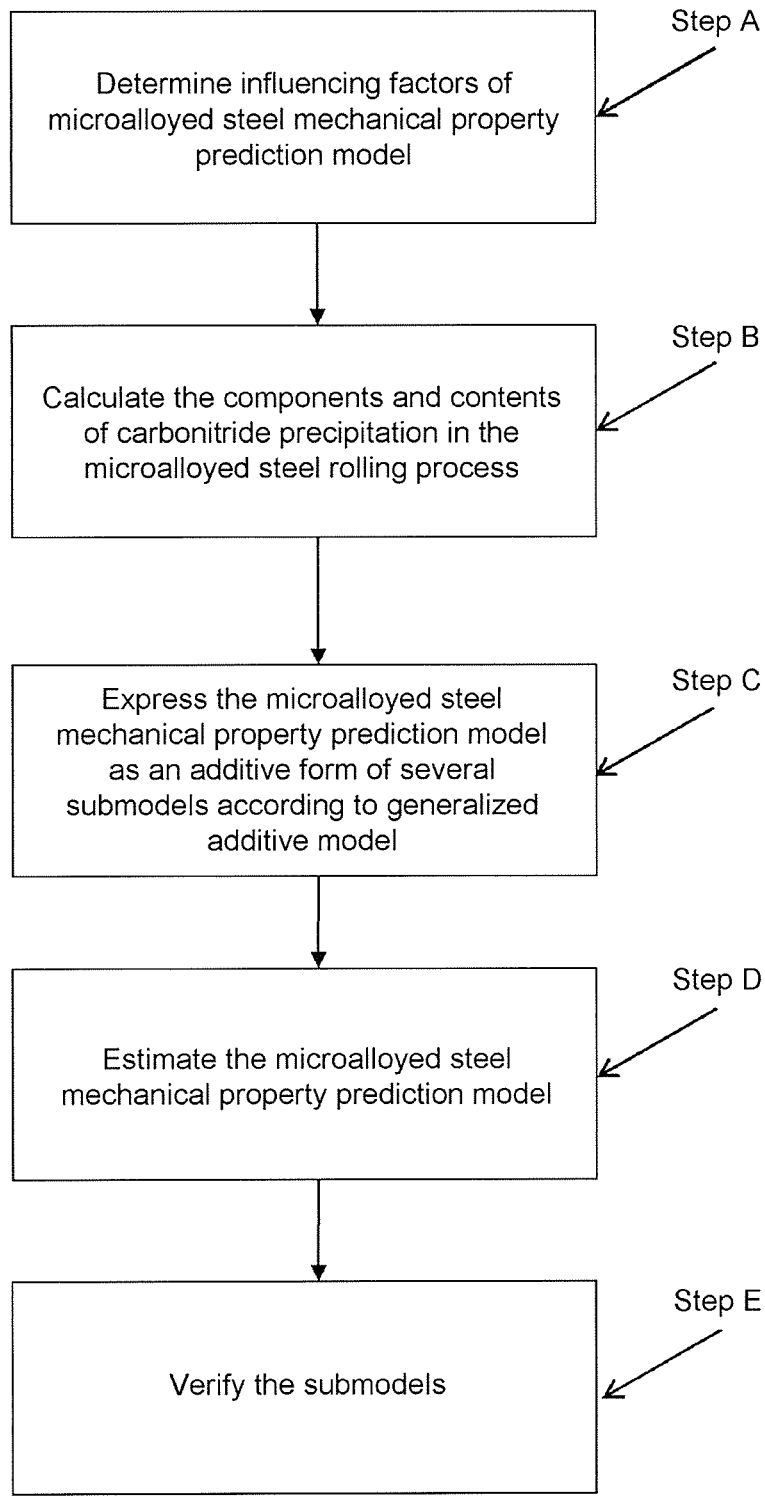
FIG. 1 is a flowchart of a microalloyed steel mechanical property prediction method based on globally additive model according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

With reference to the accompanying drawings and the embodiments, a microalloyed steel mechanical property prediction method based on globally additive model provided in the present invention is described in detail below.

In the following, a mechanical property prediction model is established by using hot continuous rolled microalloyed steel containing Nb as an example.

Figure 2:
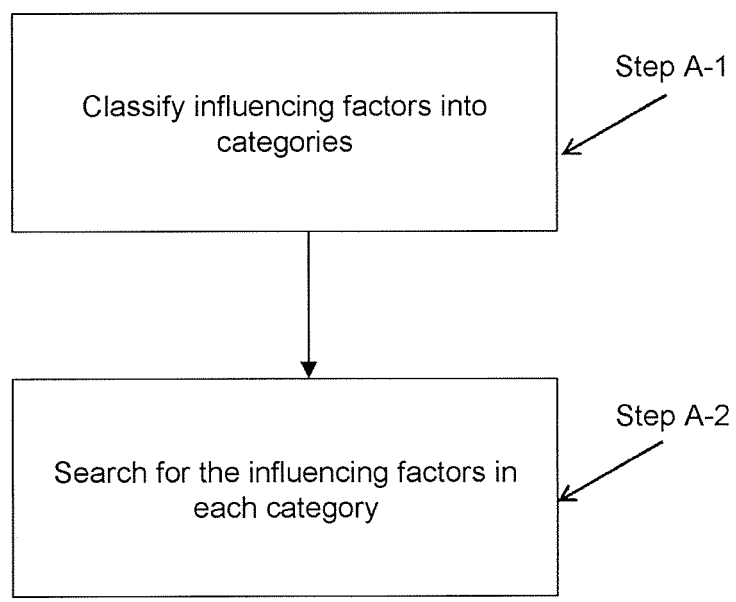
FIG. 2 is a flowchart of step A according to an embodiment of the present invention.
Figure 3:
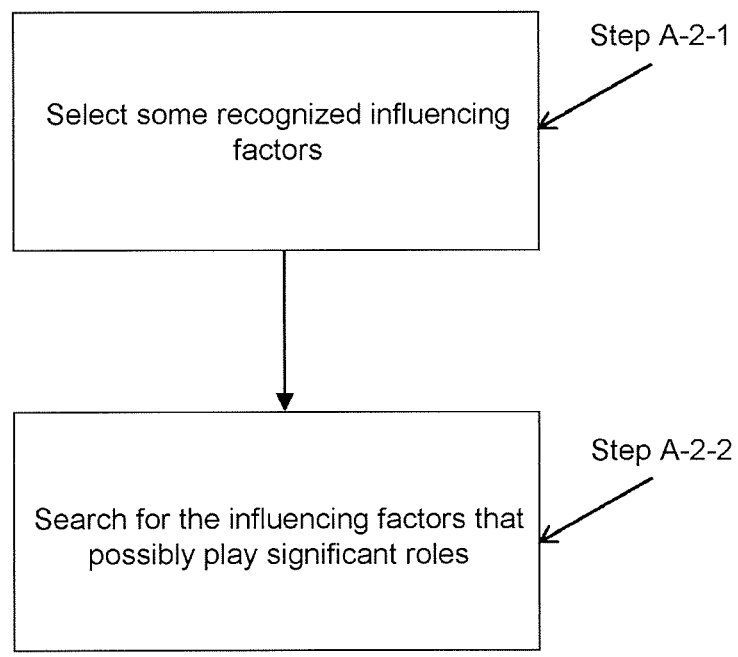
FIG. 3 is a flowchart of step A-2 according to an embodiment of the present invention.

As shown in FIG. 1, FIG. 2, and FIG. 3, step A: the influencing factors of a microalloyed steel mechanical property prediction model are determined, and perform step B.

Industrial big data analysis is performed on the parameters in a mechanical property prediction process, to search for the proper influencing factors. The influencing factor has diversity and complexity, and therefore a process of searching for the influencing factor is a repeated correction process. By means of an analysis method such as the random forests algorithm or the Bayesian method and with reference to the metallurgical mechanism and priori knowledge, chemical components such as carbon, silicon, manganese, phosphorus, and niobium in strip steel, and rolling process parameters such as reheating temperature $T_F$, roughing rolling temperature $T_R$, finishing entry temperature $T_{FE}$, finishing rolling delivery temperature $T_{FD}$, coiling temperature $T_C$, and finishing rolling delivery thickness $H_{FD}$ are selected as influencing factors (that is, independent variables) of the model. Mechanical property parameters such as tensile strength and yield strength are selected as response variables of the model.

There are many factors that affect the mechanical property, and there are interactions between some variables. This requires a combination of the metallurgical mechanism, statistical method, and the priori knowledge when influencing factors are being looked for.

Step A-1: Classify influencing factors: classify the influencing factors into four categories according to the metallurgical mechanism, the data collection process, and priori knowledge: chemical components, process parameters, detection parameters, and abnormal markers. The detection-related variables are used to describe "how data comes", for example, sampling unit, sampling time, sampling direction, sample specification, and yield type. When model research reaches an extent, such factors become main factors that limit improvement of precision and reliability of a model. Step A-2 is performed.

Figure 4:
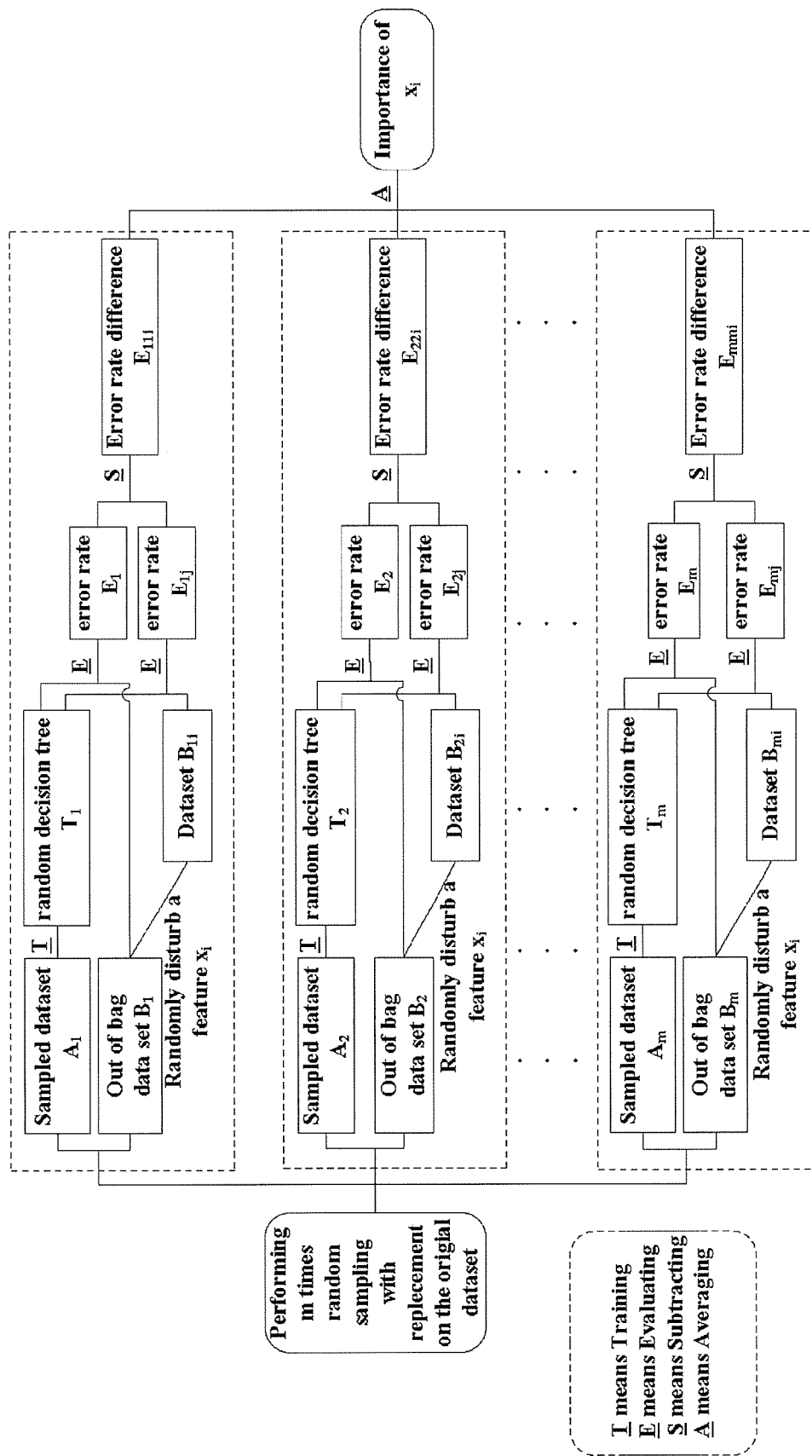
FIG. 4 is a flowchart of determining the importance of independent variables according to an embodiment of the present invention.

Step A-2: Search for the influencing factors in each category, where this step comprises the following steps:

Step A-2-1: Select some recognized influencing factors, for example, components such as C, Si, Mn, N, Nb, V, and Ti, and process parameters such as reheating temperature, finishing rolling temperature, coiling temperature, and finishing rolling delivery thickness. Then, influencing factors that possibly play a significant role are looked for. FIG. 4 is a flowchart of determining the importance of independent variables by using random forests algorithm. Whether the variable plays a role is determined according to the importance of the variable. It is noteworthy that, a variable found by using the random forests algorithm only indicates that the variable can be used to well distinguish data, but cannot indicate that the variable inevitably affects the dependent variable. Due to data complexity, the process of searching for influencing factors is a repeated assumption, analysis, checking, and revision process.

Step B: Calculate the components and contents of carbonitride precipitation in the microalloyed steel rolling process, and perform step C.

Step B-1: Based on the multivariate second-phase solid solution and precipitation theory, develop a thermodynamic model in which the component and the content of the carbonitride precipitation in the hot rolling process can be quantitatively calculated, and consider interactions between the carbonitride and AlN. A thermodynamic model for an Fe—M—C—N alloy system is as follows:

$$\ln\frac{yK_{MC}}{[M_a][C_a]} + (1-y)^2\frac{L_{CN}}{RT} = 0 \quad (1)$$

$$\ln\frac{(1-y)K_{MN}}{[M_a][N_a]} + y^2\frac{L_{CN}}{RT} = 0 \quad (2)$$

$$M_0 = \frac{1}{2}f_p + (1-f_p)[M_a] \quad (3)$$

$$C_0 = \frac{y}{2}f_p + (1-f_p)[C_a] \quad (4)$$

$$N_0 = \frac{(1-y)}{2}f_p + (1-f_p)[N_a] \quad (5)$$

In the foregoing formula, $K_{MC}$ and $K_{MN}$ are respectively solubility products of pure carbide and nitride, $[M_a]$, $[C_a]$, and $[N_a]$ are mole fractions of solid-soluted elements, $L_{CN}=-4260$ J/mol is the interaction coefficient, $R=8.314$ J/(K·mol) is the gas constant, T is the absolute temperature, $M_0$, $C_0$, and $N_0$ are mole fractions of the microalloyed element, carbon element, and nitrogen element in steel, and $f_p$ is the mole fraction of precipitated niobium carbonitride.

When there is AlN precipitated, because AlN has a hexagonal lattice structure, AlN is insoluble in carbonitride with a NaCl structure and independently exists. For the Fe—Al—Nb—C—N thermodynamic equilibrium system, the formulas (3) to (5) need to be replaced with the following formulas:

$$[Al_a][N_a] = K_{AlN} \quad (6)$$

$$M_0 = \frac{1}{2}f_p + (1-f_p-f_{AlN})[M_a] \quad (7)$$

$$Al_0 = \frac{1}{2}f_{AlN} + (1-f_p-f_{AlN})[Al_a] \quad (8)$$

$$C_0 = \frac{y}{2}f_p + (1-f_p-f_{AlN})[C_a] \quad (9)$$

$$N_0 = \frac{(1-y)}{2}f_p + \frac{1}{2}f_{AlN} + (1-f_p-f_{AlN})[N_a] \quad (10)$$

In the foregoing formulas, $K_{AlN}$ is the mole fraction of solid-soluted Al in austenite, $K_{AlN}$ is the solubility product of AlN, $f_{AlN}$ is the mole fraction of the precipitated AlN, and $Al_0$ is the mole fraction of Al in the steel. In addition, $K_{MC}$, $K_{MN}$, and $K_{AlN}$ are all binary second-phase equilibrium solubility products, and generally may both be represented as:

$$K_{MX}=[M_a][X_a]=C\times10^{A-B/T} \quad (11)$$

In the formula, $$C = \frac{A_{Fe}^2}{10^4 A_M A_X},$$

$A_{Fe}$, $A_M$, and $A_X$ are respectively relative atomic masses of iron, the alloy element, and the interstitial element (carbon element or nitrogen element), and A and B are coefficients of the solubility product formula.

Figure 5:
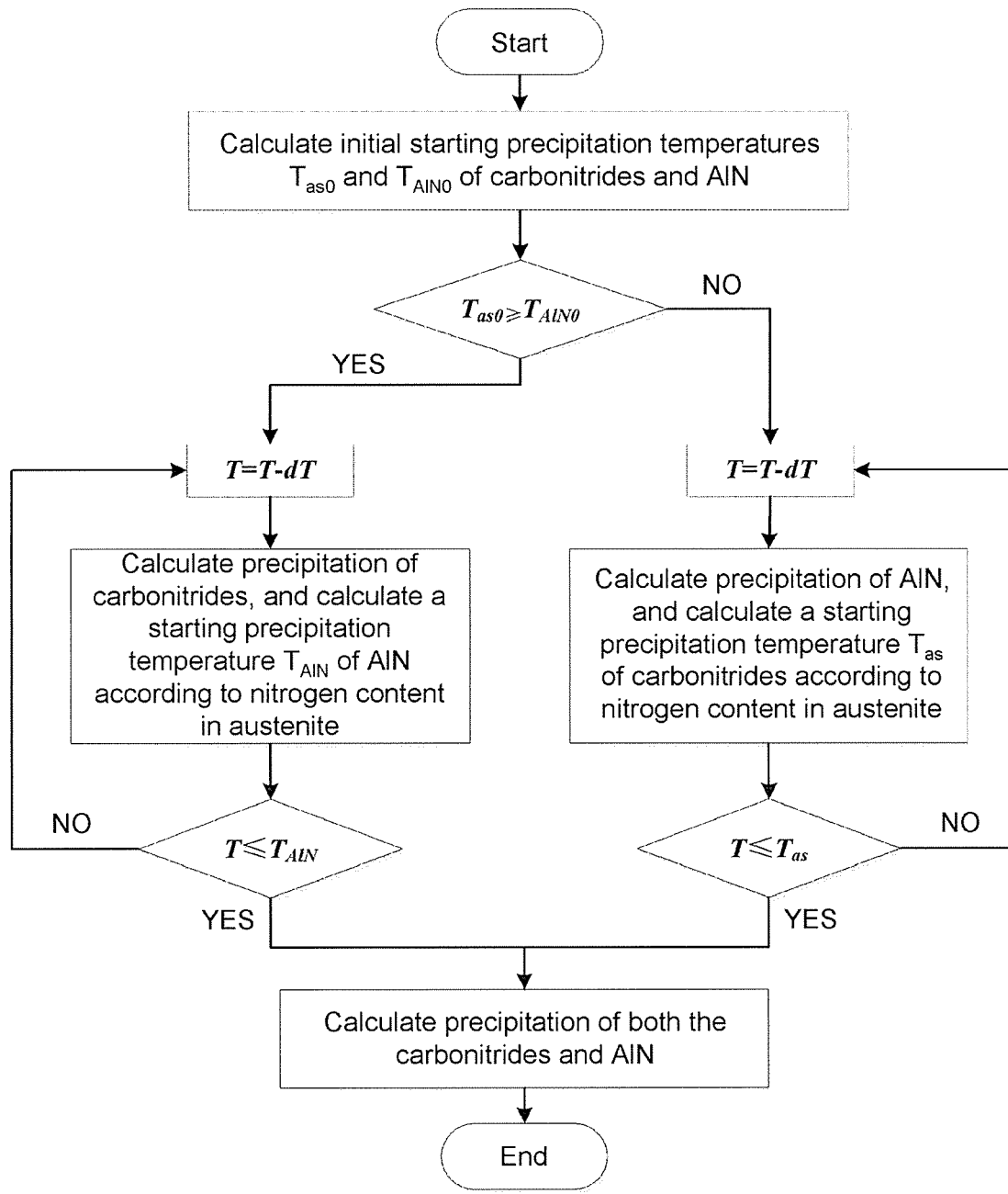
FIG. 5 shows a thermodynamic numerical calculation procedure for carbonitride precipitation in microalloyed steel according to an embodiment of the present invention.

Step B-2: Solve the thermodynamic model above. The thermodynamic model is a group of very complex nonlinear equations. Therefore, numerical solution is performed by using the Newton-Raphson algorithm to determine beginning precipitation temperatures and the precipitation order of the carbonitride and AlN for strips with different components by using an iterative solving process, so as to finally obtain the component and the content of the carbonitride precipitation in the microalloyed steel rolling process. The calculation procedure is shown in FIG. 5.

Research shows that Nb, C, and N in strip steel precipitate in an austenite phase to form the niobium carbonitride compound. Therefore, contents of NbC and NbN precipitated from each roll of strip steel in the rolling process need to be calculated by using the thermodynamic model, and are represented by mass fractions.

Figure 6A:
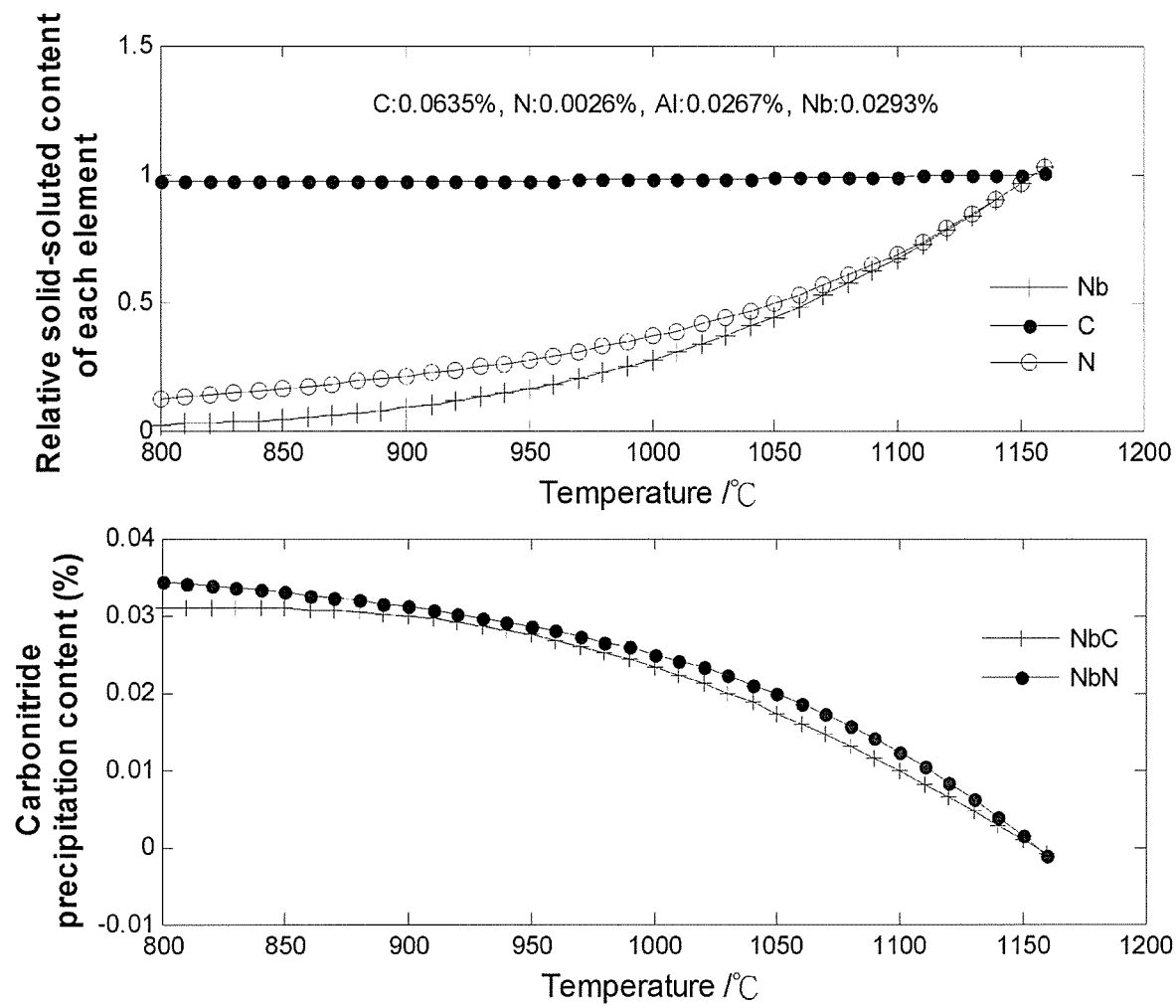
FIG. 6(a) is a diagram of the calculation result without AlN precipitation according to an embodiment of the present invention.
Figure 6B:
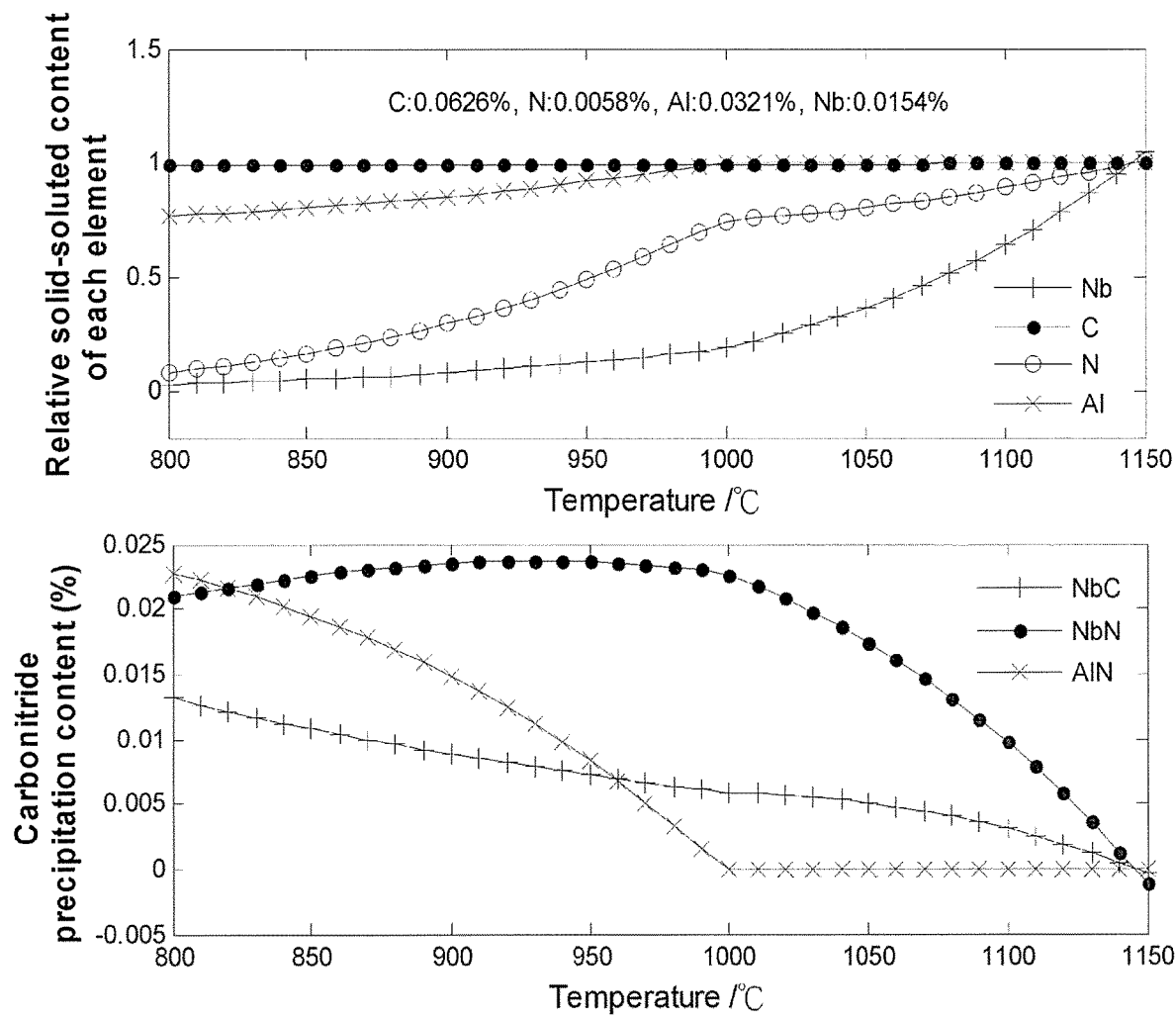
FIG. 6(b) is a diagram of the calculation result with AlN precipitation according to an embodiment of the present invention.
Figure 7A:
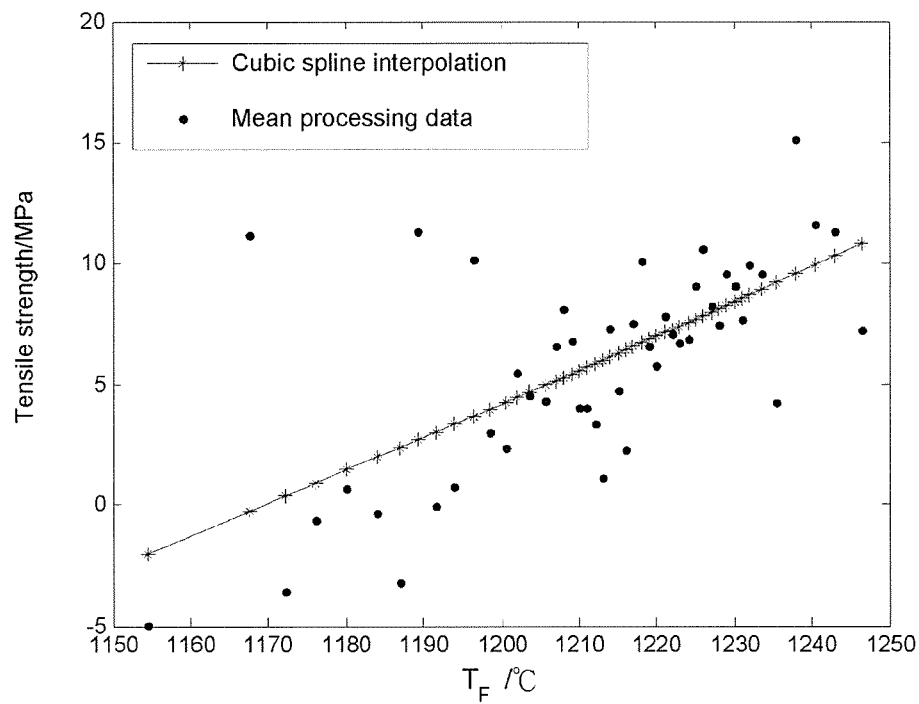
FIG. 7(a) is a diagram of a smooth function of the reheating temperature that affects tensile strength according to an embodiment of the present invention.
Figure 7B:
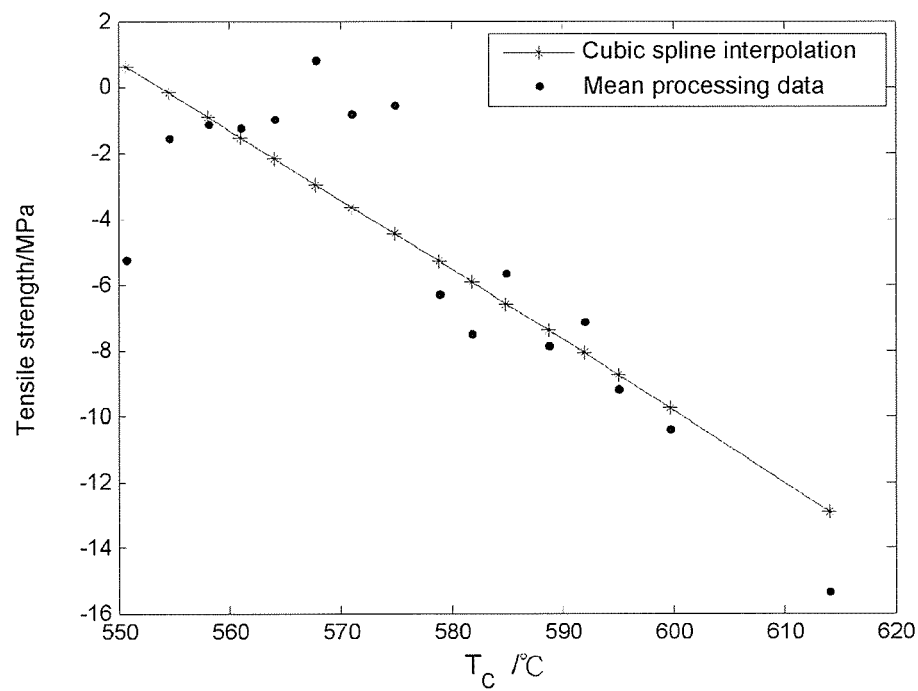
FIG. 7(b) is a diagram of a smooth function of the coiling temperature that affects tensile strength according to an embodiment of the present invention.
Figure 7C:
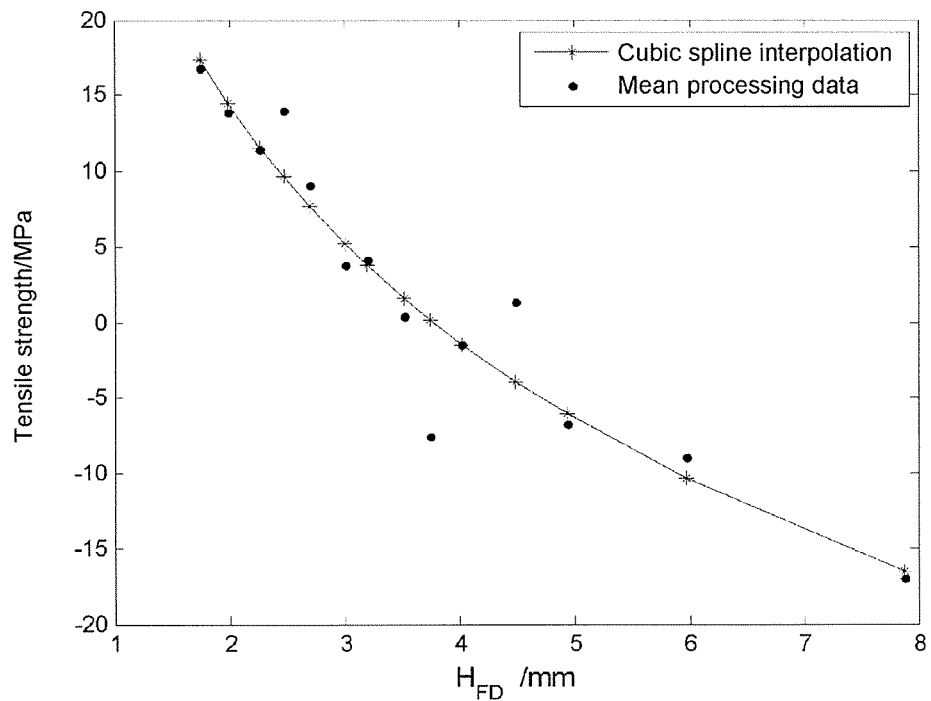
FIG. 7(c) is a diagram of a smooth function of the finishing rolling delivery thickness that affects tensile strength according to an embodiment of the present invention.
Figure 7D:
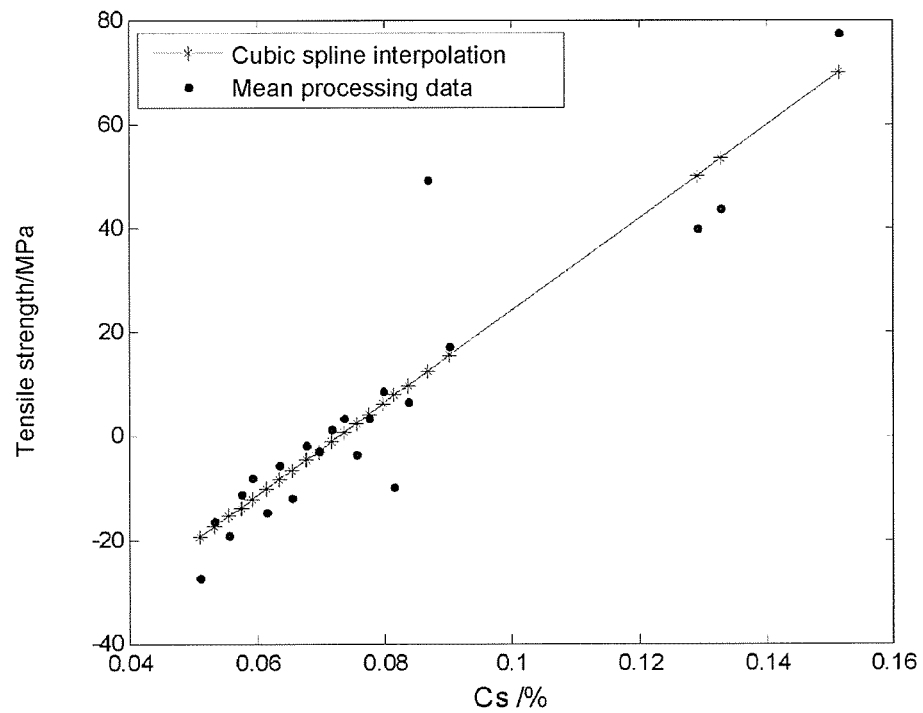
FIG. 7(d) is a diagram of a smooth function of residual carbon (a mass fraction) that affects tensile strength according to an embodiment of the present invention.
Figure 7E:
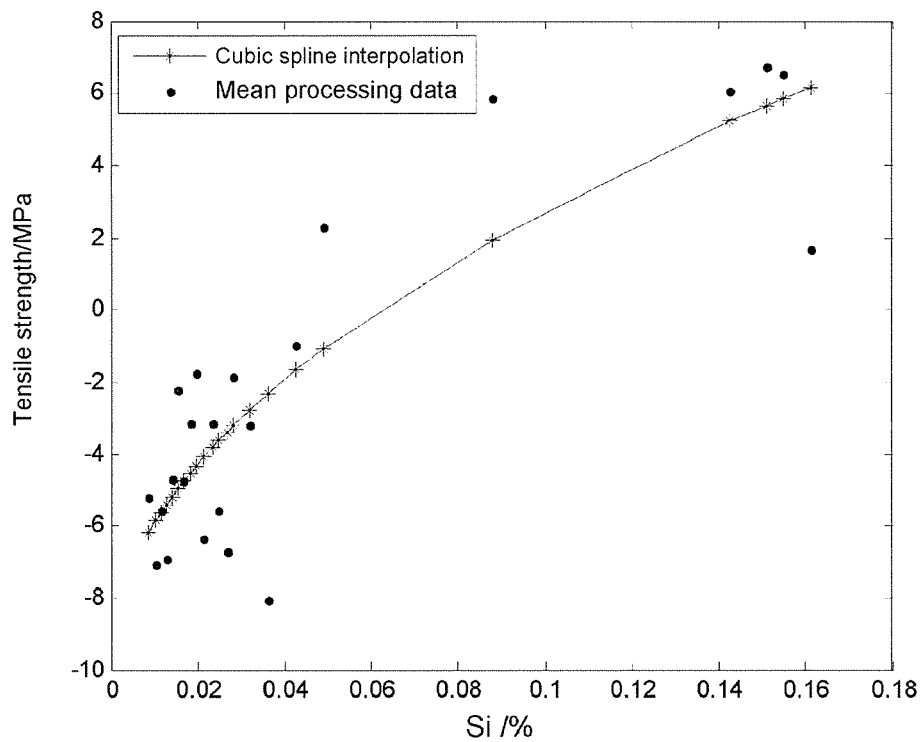
FIG. 7(e) is a diagram of a smooth function of silicon (a mass fraction) that affects tensile strength according to an embodiment of the present invention.
Figure 7F:
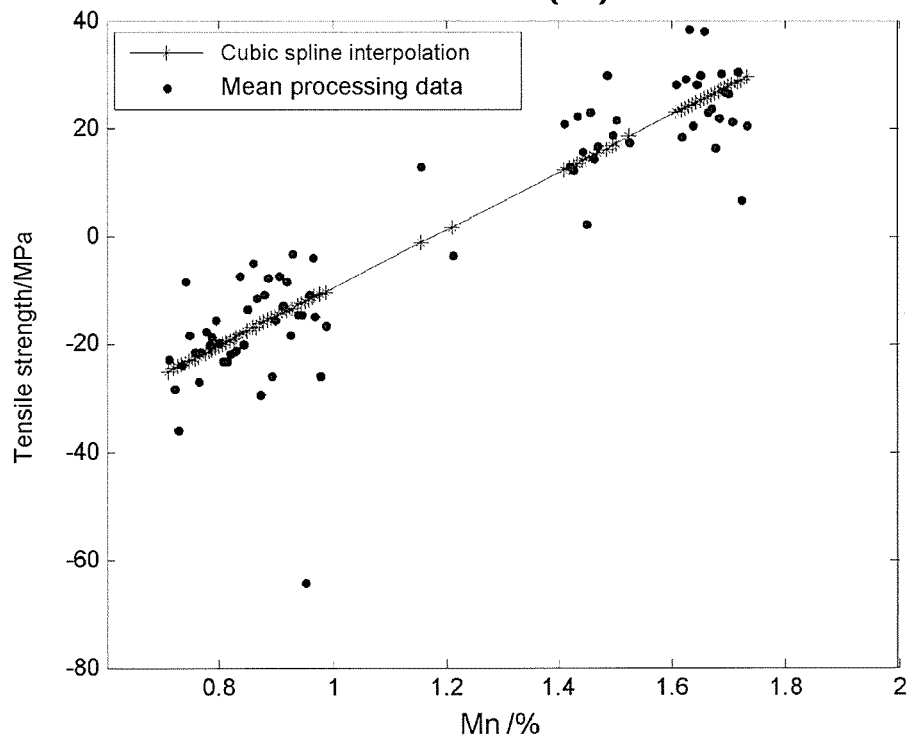
FIG. 7(f) is a diagram of a smooth function of manganese (a mass fraction) that affects tensile strength according to an embodiment of the present invention.
Figure 7G:
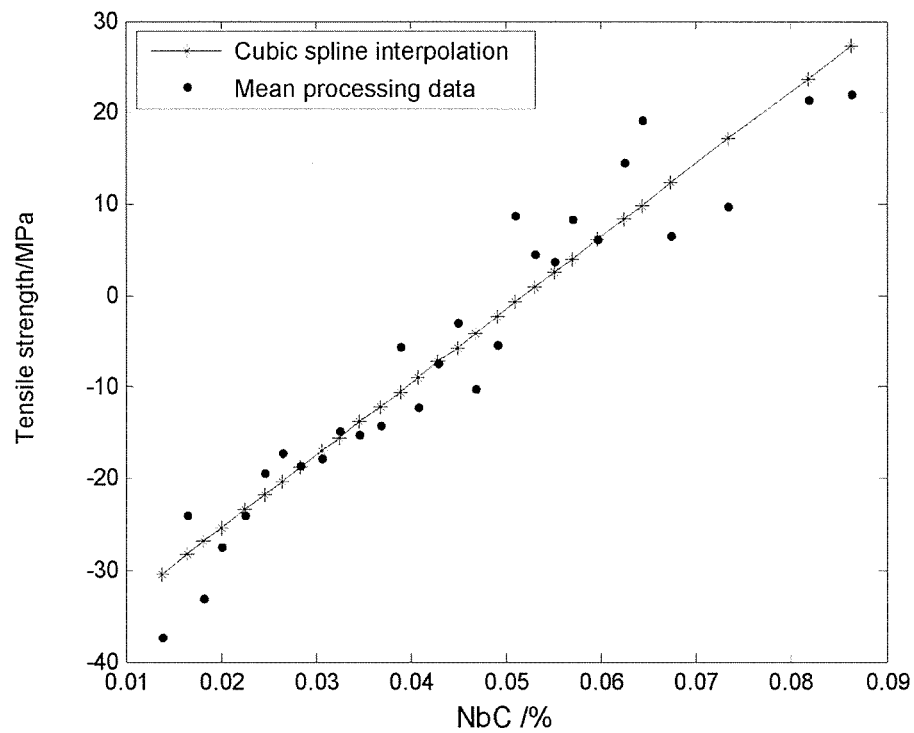
FIG. 7(g) is a diagram of a smooth function of niobium carbide (a mass fraction) that affects tensile strength according to an embodiment of the present invention.
Figure 7H:
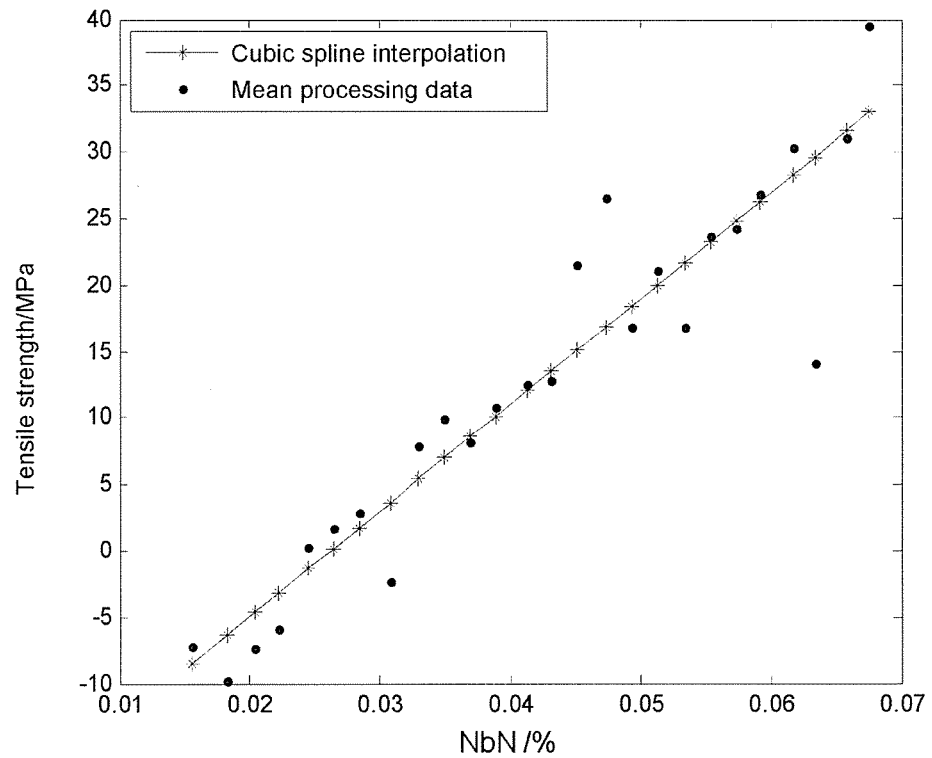
FIG. 7(h) is a diagram of a smooth function of niobium nitride (a mass fraction) that affects tensile strength according to an embodiment of the present invention.

For example, FIG. 6(a) and FIG. 6(b) show calculation results of two rolls of strip steel, FIG. 6(a) shows a case without AlN precipitation, and FIG. 6(b) shows a case with AlN precipitation.

The model can be used to automatically calculate, according to the component and temperature of the strip, whether there is AlN precipitated. For convenience of comparison, the solid solution mass fraction of each element is represented by using a ratio relative to the original component.

It can be learned from FIG. 6(b) that, as the temperature decreases, mass fractions of solid-soluted N and Nb elements continuously decrease, and mass fractions of precipitated NbC and NbN continuously increase. In an entire process, the decrease rate of the carbon element is very slow. By means of the foregoing calculation, the mass fractions of NbC and NbN precipitated in austenite of each roll of strip steel can be obtained, and then be used for subsequent mechanical property prediction modeling research.

Step C: Express the microalloyed steel mechanical property prediction model as an additive form of several submodels according to generalized additive model, and perform step D.

First, a theory related to the generalized additive model is briefly described. The generalized additive model is non-parametric extension of generalized linear model. The independent variable is fitted by using a non-parametric function, to estimate the relationship between the dependent variable and the independent variable. Each additive item in the model is estimated by using a single smooth function, and in each additive item, that how the dependent variable varies with the independent variable may be explained. The advantage of the model is that a nonlinear relationship between the dependent variable and the independent variable in high-dimensional data can be processed, and it is suitable for performing an exploratory analysis on data or searching for whether there is a dependence relationship between the dependent variable and the independent variable. The generalized additive model is widely used in many academic fields due to its advantages of simple structure and good flexibility and stability, and its mathematical expression may be written as:

$$g(\mu) = \alpha + \sum_{j=1}^{p} f_j(X_j) \quad (12)$$

In the formula, $\mu$ is a conditional expectation of the dependent variable Y, $\mu = E(Y|X_1, X_2, \ldots, X_P)$, $g(\cdot)$ is a link function, $\alpha$ is an intercept, $f_j(\cdot)$ is the single variable function of the independent variable $X_j$, and p is the number of independent variables.

For the steel mechanical property prediction model, the identity function may be selected as the link function; an estimation method for the single variable smooth function of each independent variable is selected according to the scatter plot of each independent variable and dependent variable. Because the cubic smooth spline has advantages such as simple calculation, good stability, guaranteed astringency, the cubic smooth spline estimation method is selected.

Based on the above, a basic form of the steel mechanical property prediction model may be written as:

$$T_S = \alpha + \sum_{j=1}^{p} S_j(X_j) \quad (13)$$

where $T_S$ represents the mechanical property parameter of steel, such as tensile strength, yield strength, or extensibility; $\alpha$ is an intercept; $S_j(\cdot)$ is the cubic smooth spline function of each independent variable $X_j$, and additionally represents submodels of the mechanical property prediction model; and p is the number of independent variables.

The submodels generally include two categories: submodels for chemical components such as C, Mn, Si, P, Nb, Ti, V, Mo, Cr, and carbonitrides which are generated by the interactions, and submodels for process parameters such as reheating temperature, roughing rolling temperature, finishing rolling entry temperature, coiling temperature, and finishing rolling delivery thickness.

A single variable smooth function of each independent variable is estimated by using the cubic smooth spline, and the form of the model is set as:

$$T_S = \alpha + \sum_{i=1}^{p} S_i(X_i) \quad (14)$$

In the formula, $S_i(X_i)$ is a cubic smooth spline function of each independent variable, and mainly comprises influencing factors such as $T_F$, $T_R$, $T_{FE}$, $T_{FD}$, $T_C$, $H_{FD}$, Cs (residual carbon), Si, Mn, P, NbC, and NbN.

Step D: Estimate the microalloyed steel mechanical property prediction model, and perform step E.

After the basic form of the steel mechanical property prediction model is determined, the microalloyed steel mechanical property prediction model is estimated according to a large amount of hot rolling process data collected onsite, that is, a parametric form or a non-parametric form of each submodel is obtained by using an estimation algorithm.

Each single variable smooth function $S_j(X_j)$ is estimated by using the Back-fitting algorithm, and the specific implementation process of the estimation is as follows:

initialization let $m = 0$:

$$\alpha_0 = E(Y) = \frac{\sum_{i=1}^{n} y_i}{n}$$

$$f_1^m(X_1) = f_2^m(X_2) = \ldots = f_p^m(X_p) = 0;$$

iteration: let $m = m + 1$:

$$R_i = Y - \alpha_0 - \sum_{j=1}^{i-1} f_j^m(X_j) - \sum_{j=i+1}^{p} f_j^{m-1}(X_j)$$

$$f_i^m(X_i) = E(R_i | X_i);$$

and
end: until $$E\left(Y - \alpha_0 - \sum_{j=1}^{p} f_j^m(X_j)\right)^2$$

is less than a predetermined positive constant or the number of iterations reaches the preset number.

The number of cycles of the Back-fitting algorithm is set to 10, and when cyclic iteration calculation ends, $\alpha = 539.16$ is obtained.

The following provides diagrams of smooth functions of main influencing factors of the tensile strength. As shown in FIG. 7(a), FIG. 6(b), FIG. 6(c), FIG. 6(d), FIG. 6(e), FIG. 6(f), FIG. 6(g), and FIG. 6(h), these figures represent the laws of how the factors affect the tensile strength.

Step E: Verify reliability of the submodels.

After the mechanical property prediction model is established, reliability of the submodels needs to be verified according to the metallurgical mechanism and production data, that is, authenticity of a law obtained by the submodel needs to be verified. An authentic law often has repeatability. Therefore, when the reliability of the submodels is verified, importance should be attached to the repeatability of the law, and whether the law can be reproduced by data should be verified in different dimensions, thereby preventing generation of some false laws. If a law obtained by a submodel can be reproduced by data or no clear evidence can be found to prove falsehood of the law in most cases, the submodel is considered reliable. Otherwise, the cause of submodel failure needs to be analyzed, and the submodel needs to be revised again.

As shown in FIG. 7(a), FIG. 6(b), FIG. 6(c), FIG. 6(d), FIG. 6(e), FIG. 6(f), FIG. 6(g), and FIG. 6(h): (1) The tensile strength increases as the reheating temperature increases. This is because a higher heating temperature indicates a larger mass fraction of niobium dissolves into austenite, and more carbonitride that can be precipitated in a subsequent cooling process. (2) The tensile strength decreases as the coiling temperature increases. This is because a higher $T_C$ indicates a higher phase transformation temperature and a higher precipitation temperature during coiling, and an increase in the phase transformation temperature indicates a decrease in the phase transformation driving force, and coarsening the microstructure, and reducing the strength. In addition, the precipitates are easier to grow in a higher temperature, reducing the effect of precipitation strengthening. (3) An increase in the finishing rolling delivery thickness causes a decrease in the tensile strength. This is because thinner strip steel indicates quicker cooling in the laminar cooling process, and therefore the transformation temperature is decreased in subcooled austenite, the driving force is increased, and the microstructure after phase transformation becomes refined. (4) A larger mass fraction of residual carbon indicates larger tensile strength. This is because the carbon element has a very strong solid solution strengthening effect, and the effect of solid solution strengthening is enhanced when carbon content is increased. In addition, the carbon element obviously improves the austenite stability, lowering the transformation temperature of subcooled austenite, and refining the microstructure. (5) Similar to the carbon element, the silicon and manganese elements also have a solid solution strengthening effect, and also can improve the austenite stability. (6) Larger mass fractions of niobium nitride and niobium carbide precipitates indicate larger tensile strength. This is because the carbonitride precipitations precipitate at grain boundary of deformed austenite, pin the grain boundary, and prevent the austenite from recrystallizing, thereby the deformation effect of austenite is maintained, providing more nucleation sites for the subsequent transformation ferrite, refining ferrite grains, and playing a role of refinement strengthening. In addition, FIG. 5 also indicates that, effects of the chemical components such as carbon, silicon, manganese, and niobium carbonitride on the tensile strength are greater than effects of the rolling process parameters such as the reheating temperature and the finishing rolling delivery thickness.

A tensile strength prediction model of hot rolled Nb microalloyed steel can be obtained according to the formula (14) and each single variable smooth function obtained in FIG. 7(a), FIG. 6(b), FIG. 6(c), FIG. 6(d), FIG. 6(e), FIG. 6(f), FIG. 6(g), and FIG. 6(h). Function values corresponding to the chemical components and process parameters may be obtained according to spline interpolation in FIG. 8. Similarly, a yield strength prediction model can be obtained by using the foregoing method.

Figure 8A:
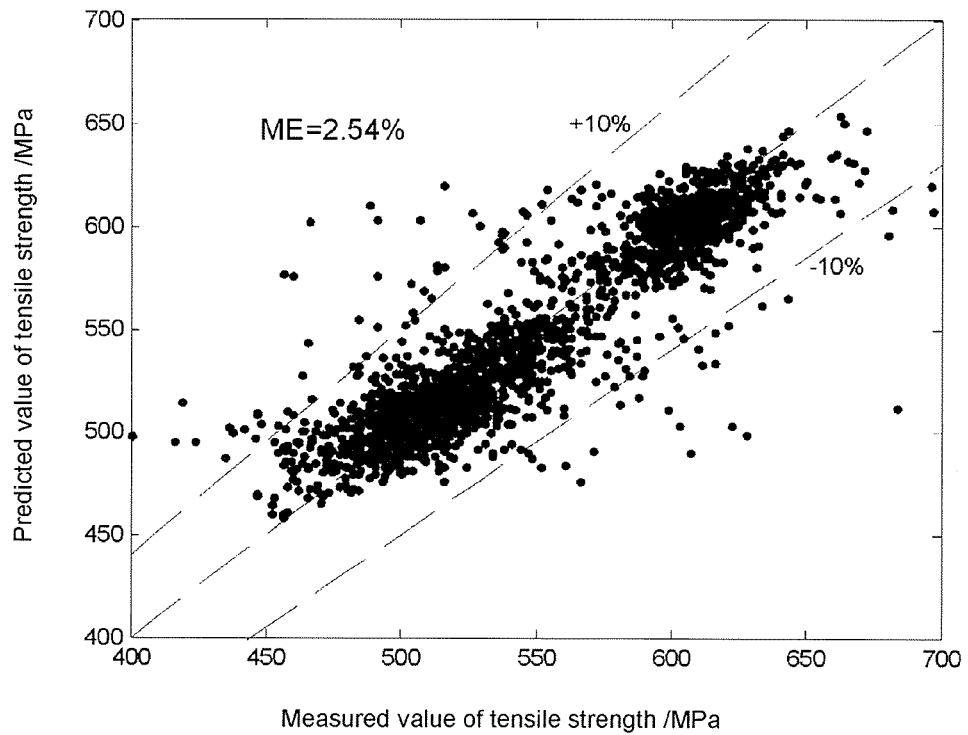
FIG. 8(a) is a diagram of comparison between predicted values and measured values of tensile strength of the mechanical property prediction model according an embodiment of the present invention.
Figure 8B:
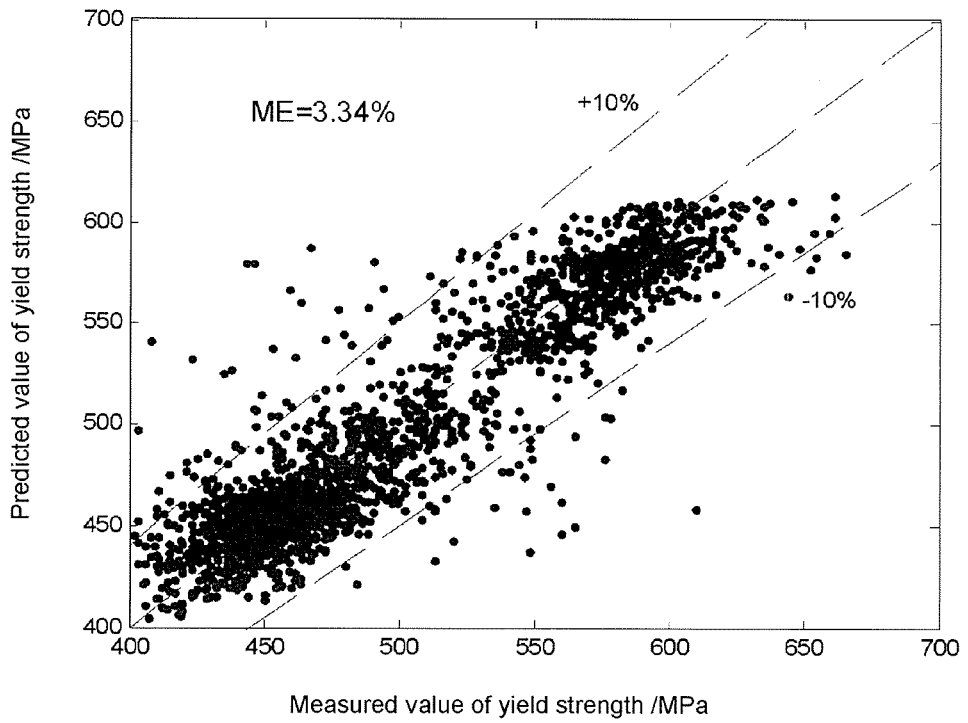
FIG. 8(b) is a diagram of comparison between predicted values and measured values of yield strength of the mechanical property prediction model according an embodiment of the present invention.

Tensile strength and yield strength of 7740 rolls of Nb microalloyed strips (including multiple steel grades) produced by a hot continuous rolling production line are calculated by using the foregoing models. Comparison between predicted values and measured values for the model is shown in FIG. 8. Table 1 shows the root-mean-square error (RMSE) and the mean absolute percentage error (ME) of the obtained models, and Table 2 describes intermediate calculation results of tensile strength for several rolls of strips.

TABLE 1

Prediction error of the model.

| Model | Tensile strength | Yield strength |
|---|---|---|
| RMSE/MPa | 21.6 | 24.6 |
| ME/% | 2.54 | 3.34 |

TABLE 2

Intermediate calculation results of tensile strength for several rolls of strips.

| Parameter | Strip steel sequence number | | | | | | | | |
|---|---|---|---|---|---|---|---|---|---|
| | 1 | 2 | 3 | 4 | 5 | 6 | 7 | 8 | 9 |
| $S_1(T_F)$ | −3.2795 | 2.4219 | 3.6200 | 4.9995 | 5.6934 | 6.0414 | 6.9145 | 7.2649 | 7.9679 |
| $S_2(T_R)$ | −0.1244 | 3.1508 | 6.5596 | 3.2660 | 4.2984 | 2.9198 | 2.2243 | 3.4963 | 6.6715 |
| $S_3(T_{FE})$ | 1.2963 | 2.2378 | 0.9874 | 2.1188 | 2.4368 | 2.4767 | 2.1981 | 2.5967 | 1.3739 |
| $S_4(T_{FD})$ | −8.2952 | −2.6317 | 0.1411 | −7.6808 | −1.4386 | −1.0425 | −7.4764 | −2.4324 | −1.8355 |
| $S_5(T_C)$ | −0.1550 | 1.4211 | 0.7026 | 2.5783 | 0.4162 | 1.7096 | 6.1059 | 1.9986 | 5.5121 |
| $S_6(H_{FD})$ | −5.9162 | 2.1314 | 5.6170 | 17.848 | 2.0221 | 2.0028 | 17.822 | 2.0221 | 15.714 |
| $S_7(Cs)$ | −4.8975 | −5.0430 | −3.2161 | 6.3459 | −5.4361 | −5.4900 | 6.0207 | −4.9135 | −4.2815 |
| $S_8(Si)$ | −22.322 | −22.600 | −13.670 | 12.143 | −18.891 | 18.5810 | 12.891 | −18.453 | 24.381 |
| $S_8(Mn)$ | 8.0385 | 7.6830 | 6.6687 | 7.2230 | 4.0278 | 3.7995 | 6.6687 | 3.8449 | 7.8596 |
| $S_{10}(P)$ | −17.967 | −13.777 | −6.1483 | −15.339 | −21.255 | −15.859 | −12.920 | −17.322 | −6.1531 |
| $S_{11}(Nbc)$ | 9.9839 | 7.1897 | 18.559 | 21.117 | 1.2532 | −1.5389 | 20.931 | −2.7791 | 25.876 |
| $S_{12}(NbN)$ | −9.2894 | −5.1192 | −9.3244 | 5.8124 | −0.7447 | −0.1989 | 3.0863 | −7.8254 | −1.0669 |
| $T_s$ predicted value/MPa | 486.236 | 516.228 | 549.659 | 599.595 | 511.546 | 515.402 | 603.629 | 506.661 | 621.182 |
| $T_s$ measured value/MPa | 483 | 511 | 547 | 605 | 507 | 521 | 602 | 511 | 616 |
| Error rate/% | 0.67 | 1.02 | 0.49 | 0.89 | 0.90 | 1.07 | 0.27 | 0.85 | 0.84 |

It can be learned that, all obtained submodels comply with existing experience and mechanism knowledge, and new models have relatively high prediction precision. In addition, no manual revision is required in the calculation process. In the model, deviations between the predicted values and the measured values are all within a small range. The model has relatively strong adaptability.

Functions and Effects of the Embodiments

According to the microalloyed steel mechanical property prediction method based on globally additive model provided in the embodiments, "globally" means that modeling is performed by collecting production data of multiple steel grades, but not for only a specific steel grade; "additive" means that the model is additive in form. The mechanical property prediction model is divided into multiple submodels by using the generalized additive model.

In addition, impact of carbonitride precipitation of the microalloyed elements on mechanical property needs to be considered. The thermodynamic model is developed based on the multivariate second-phase solid solution and precipitation theory, the components and contents of carbonitride precipitation including different components in the microalloyed steel rolling process at different temperatures are quantitatively calculated, and the calculated component and the content of the carbonitride precipitations are combined with actual production data of microalloyed steel, to establish the mechanical property prediction models that have high reliability, strong extensionality, and wide practicability.

The microalloyed steel mechanical property prediction models obtained in the foregoing technical solution have advantages such as high calculation precision and a wide adaptation range, and may be used for design of new microalloyed steel products and steel grade optimization, so as to reduce a quantity of conventional physical tests, shorten the product research and development cycle, and reduce research and development costs.

The foregoing implementations are exemplary cases of the present invention, and are not intended to limit the protection scope of the present invention.

What is claimed is:

1. A microalloyed steel mechanical property prediction method based on globally additive model, comprising the following steps:

step A, determining, by a processor, influencing factors of a mechanical property prediction model of microalloyed steel, wherein the determined influencing factors include chemical components and microalloyed steel rolling process parameters, the chemical components include carbon, silicon, manganese, phosphorus and niobium in steel, and the microalloyed steel rolling process parameters include a reheating temperature, a roughing rolling temperature, a finishing entry temperature, a finishing rolling delivery temperature, a coiling temperature and a finishing rolling delivery thickness;

step B, calculating, by the processor, components and contents of carbonitride precipitation in the microalloyed steel rolling process;

step C, expressing, by the processor, the mechanical property prediction model of microalloyed steel as an additive form of several submodels according to generalized additive model;

step D, estimating, by the processor, the mechanical property prediction model of microalloyed steel;

step E, verifying, by the processor, reliability of the submodels; and step F, designing microalloyed steel products and optimizing steel grade by the processor using the mechanical property prediction model of microalloyed steel;

wherein the step B comprises the following steps:

step B-1, developing a thermodynamic model in which the components and the contents of the carbonitride precipitation in hot rolling process are capable of being quantitatively calculated based on a multivariate second-phase solid solution and precipitation theory, and considering interactions between the carbonitrides and AlN(aluminum nitride); and step B-2, solving the thermodynamic model, wherein numerical solution is performed by using the Newton-Raphson algorithm, to determine beginning precipitation temperatures and the precipitation order of the carbonitrides and AlN for the steel with different components by using an iterative solving process, so that the components and the contents of the carbonitride precipitation are obtained in the microalloyed steel rolling process, wherein the thermodynamic model comprises:

$$\ln\frac{yK_{MC}}{[M_a][C_a]} + (1-y)^2\frac{L_{CN}}{RT} = 0$$

$$\ln\frac{(1-y)K_{MN}}{[M_a][N_a]} + y^2\frac{L_{CN}}{RT} = 0$$

$$[Al_a][N_a] = K_{AlN}$$

$$M_0 = \frac{1}{2}f_P + (1-f_P-f_{AlN})[M_a]$$

$$Al_0 = \frac{1}{2}f_{AlN} + (1-f_P-f_{AlN})[Al_a]$$

$$C_0 = \frac{y}{2}f_P + (1-f_P-f_{AlN})[C_a]$$

$$N_0 = \frac{(1-y)}{2}f_P + \frac{1}{2}f_{AlN} + (1-f_P-f_{AlN})[N_a]$$

wherein y is an atomic fraction of carbon element in each sublattice, $K_{MC}$ and $K_{MN}$ are respectively solubility products of pure carbide and nitride, $[M_a]$, $[C_a]$, and $[N_a]$ are mole fractions of solid-soluted elements, $L_{CN}=-4260$ J/mol is an interaction coefficient, R=8.314 J/(K·mol) is the gas constant, T is the absolute temperature, $M_0$, $C_0$, and $N_0$ are mole fractions of microalloyed element, carbon element, and nitrogen element in the steel, $f_p$ is the mole fraction of precipitated niobium carbonitride, $[Al_a]$ is the mole fraction of solid-soluted Al in austenite, $K_{AlN}$ is the solubility product of AlN, $f_{AlN}$ is the mole fraction of the precipitated AlN, and $Al_0$ is the mole fraction of Al(aluminum) in the steel; in addition, $K_{MC}$, $K_{MN}$, and $K_{AlN}$ are all binary second-phase equilibrium solubility products, and are represented as:

$$K_{MX}=[M_a][X_a]=C\times 10^{A-B/T}$$

wherein $$C = \frac{A_{Fe}^2}{10^4 A_M A_X},$$

and $A_X$ are respectively relative atomic masses of iron, an alloy element, and an interstitial element, and A and B are coefficients of the solubility product formula, wherein $K_{MX}$ is $K_{MC}$, or $K_{MN}$, $X_a$ is $[C_a]$, or $[N_a]$, wherein a basic form of the mechanical property prediction model of microalloyed steel is $$T_S = \alpha + \sum_{j=1}^{p} S_j(X_j)$$

wherein $T_S$ represents a mechanical property parameter of the steel including a tensile strength and a yield strength of the steel, $\alpha$ is an intercept, $S_j(\cdot)$ is a cubic smooth spline function of each independent variable $X_j$ including the determined influencing factors, and additionally represents submodels of the mechanical property prediction model, and p is the number of independent variables, wherein the mechanical property prediction model of microalloyed steel is estimated according to hot rolling process data collected onsite, after the basic form of the mechanical property prediction model of microalloyed steel is determined, in step D, wherein the mechanical property parameter of the steel and the determined influencing factors are obtained from the hot rolling process data collected onsite; and the cubic smooth spline function is estimated by a Backfitting algorithm, wherein in the step E, calculating predicted values of the mechanical property parameter of microalloyed strip steels produced by a hot continuous rolling production line via the mechanical property prediction model of microalloyed steel, and comparing the predicted values of the mechanical property parameter of the microalloyed strip steels and measured values of the mechanical property parameter of the microalloyed strip steels to verify the reliability of the submodels.

2. The microalloyed steel mechanical property prediction method based on globally additive model according to claim 1, wherein the step A comprises:

step A-1, classifying influencing factors into three categories of chemical components, process parameters, and detection parameters, according to metallurgical mechanism, data collection process, and priori knowledge, wherein the detection parameters include sampling unit, sampling time, sampling direction, sample specification, yield type, or a combination thereof; and step A-2, searching for the influencing factors in each of the categories, wherein the step A-2 comprises the following steps:

step A-2-1, selecting some recognized influencing factors; and step A-2-2, searching for the influencing factors by using random forests algorithm.

3. The microalloyed steel mechanical property prediction method based on globally additive model according to claim 1, wherein the interstitial element is the carbon element.

4. The microalloyed steel mechanical property prediction method based on globally additive model according to claim 1, wherein the interstitial element is the nitrogen element.

5. The microalloyed steel mechanical property prediction method based on globally additive model according to claim 1, wherein the submodels comprise component submodels and process submodels.

* * * * *